United States Patent [19]

Jernberg et al.

[11] 4,347,942

[45] Sep. 7, 1982

[54] PRESSURE RELIEF DEVICE AND METHOD OF FABRICATION THEREOF

[75] Inventors: Robert H. Jernberg, East Hampton; Edwin A. Barton, Colchester, both of Conn.

[73] Assignee: Pressure-Pak Container Co., Inc., East Hampton, Conn.

[21] Appl. No.: 209,880

[22] Filed: Nov. 24, 1980

[51] Int. Cl.³ .......................... B65D 8/00; B65D 25/00; B23K 31/02; F16K 17/14

[52] U.S. Cl. ................................ 220/89 A; 137/68 R; 220/5 R; 220/5 A; 228/173 C; 228/184

[58] Field of Search .................... 220/89 A, 20.7, 5 A, 220/5 R; 137/68 R; 222/397; 228/184, 173 C; 113/120 S, 120 H

[56] References Cited

U.S. PATENT DOCUMENTS

| | | | |
|---|---|---|---|
| 2,018,714 | 10/1935 | Flanagen | 220/373 |
| 2,380,964 | 8/1945 | Grover | 220/89 A |
| 2,461,557 | 2/1949 | Lo Vico | 220/89 A |
| 3,195,769 | 7/1965 | Miller | 220/89 A |
| 3,292,826 | 12/1966 | Abplanalp | 220/89 A X |
| 3,501,043 | 3/1970 | Jernberg | 220/5 A |
| 3,515,308 | 6/1970 | Hayes et al. | 220/89 A |
| 3,520,443 | 7/1970 | Selby, Jr. | 220/89 A |
| 3,831,822 | 8/1974 | Zundel | 220/89 A X |
| 3,881,630 | 5/1975 | Lovell et al. | 220/268 |

FOREIGN PATENT DOCUMENTS

| | | | |
|---|---|---|---|
| 450338 | 3/1913 | France | 220/89 A |
| 876760 | 9/1961 | United Kingdom | 220/66 |

*Primary Examiner*—Allan N. Shoap

[57] ABSTRACT

A pressure relief device which is responsive to physical change in the end of a pressure vessel is formed by coining the end of the vessel. The device is self-regulating because the activation point automatically varies with vessel wall thickness.

5 Claims, 4 Drawing Figures

PRESSURE RELIEF DEVICE AND METHOD OF FABRICATION THEREOF

BACKGROUND OF THE INVENTION (1) Field of the Invention

The present invention relates to relieving excess pressure from high pressure vessels. More particularly, the present invention is directed to a pressure release device which is comprised of a strain sensitive area formed in the top or bottom of a pressure vessel. This safety device is activated by the physical distortion of the vessel end walls which results from over-pressurization. Accordingly, the general objects of the present invention are to provide novel and improved methods and apparatus of such character.

(2) Description of the Prior Art

Various devices for venting excess pressure from an over-pressurized vessel are known in the prior art. These prior art devices are all directly responsive to an increase of the pressure within the vessel above a safe limit.

The most commonly used pressure release device is a spring loaded pressure release valve which is installed within an opening prepared in the vessel wall. A major disadvantage incident to the use of such values is the comparatively high cost of the spring loaded device itself and the additional cost of installing the device within the wall of the vessel. Furthermore, it may be disadvantageous to use such spring loaded valves within vessels that store corrosive material which would deteriorate the spring mechanism of the device and hinder its performance.

Another prior art approach to pressure relief involves welding a safety device within an aperture formed in the wall of a vessel. The thus installed devices are activated by increased pressure and are exemplified by the disclosure of U.S. Pat. Nos. 2,380,964 and 2,951,614. The disadvantage to these devices are the additional expense in mounting the device within the wall of the vessel, particularly the energy costs since resistance welding is the commonly employed attachment technique, and the difficulty in accurately fabricating the device so that they will uniformly be activated at a given pressure.

Still other devices have been developed which release pressure from aerosol cans. Examples of such other devices may be found in U.S. Pat. Nos. 3,292,826 and 3,815,534. A major limitation with the devices of the type depicted in these patents is that they are sensitive to relatively small pressure changes and would be ineffective for use with high pressure vessels.

A major disadvantage to all of the above-mentioned prior art devices is the additional expense incident to incorporating a separately fabricated pressure sensitive device within the wall of the vessel or container. Another major disadvantage that the prior art devices are universally responsive to the increasing pressure within the vessel and thus require exact machining to insure release at a given pressure.

SUMMARY OF THE INVENTION

The present invention overcomes the above-discussed disadvantages and other deficiencies of the prior art by providing a novel technique for safely releasing excess pressure from within a container and a novel container fabrication technique which permits such safe pressure relief. The present invention also encompasses a unique pressure release device which is activated by the outward expansion of the vessel end walls.

A pressure release device in accordance with the present invention includes a frangible device located within the upper or lower end walls of a pressure vessel. The pressure vessel may be any conventional high pressure vessel similar to the one disclosed in U.S. Pat. No. 3,501,043. These high pressure vessels are formed by welding together two cylindrical halves which have been formed by a deep drawing operation. These high pressure vessels are comprised of low carbon steel with the side walls being work hardened and thus more resistant to expansion than the ends of the vessel.

The safety release device of the present invention is formed by coining an end of the vessel to define a region of reduced wall thickness. The continuing expansion of the vessel end walls past a critical point will cause tearing of the metal within the coined region. This results in the venting of excess pressure from within the high pressure vessel. A restrictor may be employed to limit the discharge rate through the hole in the vessel wall which is formed when the tearing occurs whereby any violent release of excess pressure, with a resultant movement of the vessel, will be prevented.

Some of the many numerous objects and advantages of the present invention are to vent excess pressure from within a high pressure vessel which has become over-pressurized and to provide a pressure regulation device which is integral with the metal of the high pressure vessel to reduce manufacturing steps. Furthermore, it is an object of the present invention to provide a device which regulates the venting of fluid from a container which has been subjected to excess pressure.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several FIGURES and in which.

BRIEF DESCRIPTION OF THE PREFERRED EMBODIMENT

Figure 1:
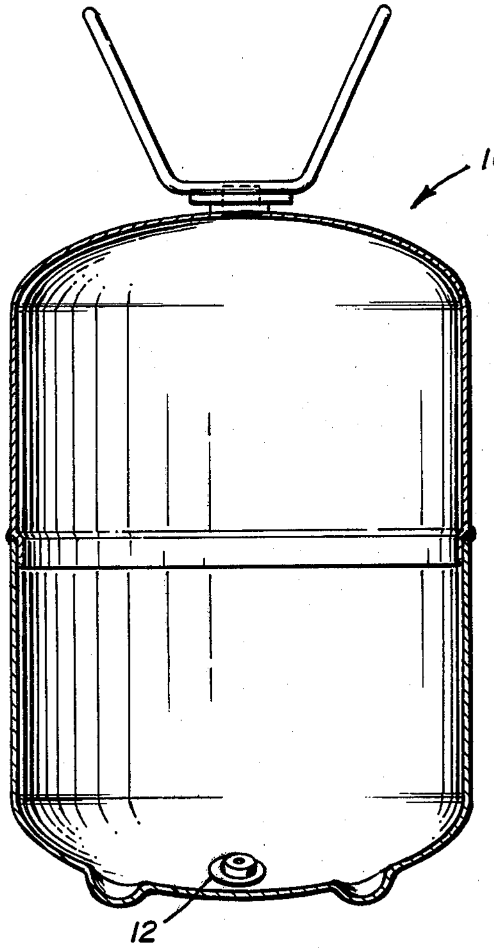
FIG. 1 is a view of a conventional pressure vessel, in longitudinal section, showing the pressure relief device of the present invention formed in the lower end wall.

Referring to FIG. 1, a pressure vessel is indicated generally at 10. Pressure relief device 12 is located within the bottom end wall of vessel 10. Preferably, vessel 10 is comprised of low carbon steel and is formed by deep drawing two cylindrical halves of equal diameter and then welding the two halves together.

Figure 2:
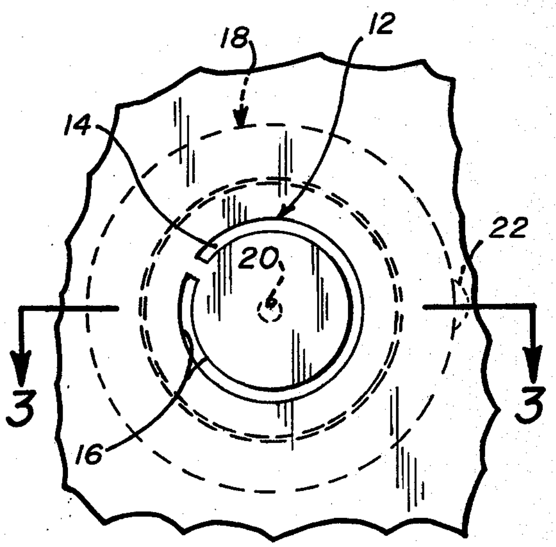
FIG. 2 is an enlarged frontal view of a pressure relief device in accordance with a preferred embodiment of the present invention.

Referring now to FIG. 2, device 12 is formed in the metal of the vessel 10 by coining area 14 to form a region of reduced wall thickness. In the disclosed embodiment region 14 is defined by bottom corners 16. Coined area 14 will preferably have side walls which are as close to being parallel as the manufacturing process will permit. Area 14 will also have a flat bottom which is preferably transverse to the side walls. Area 14 may have any shape but is preferably a spiral or circular pattern.

The depth of flat area 14 is a function of the thickness of the pressure vessel wall. Thus, the depth of area 14 will increase as the vessel wall thickness increases. The ratio of the vessel burst pressure to the relief device activation pressure is critical and in accordance with the invention this ratio remains within tolerance if the thickness of area 14 is maintained within 33% to 55% of the vessel wall thickness. Thus, the present invention is a self-regulating safety device in that the pressure release point automatically adjusts to the burst point of the vessel as the vessel wall thickness varies; such variation in thickness either being deliberately selected or being a result of the steel varying within manufacturing tolerances.

A restrictor 18 is secured within vessel 10 so as to cover device 12. Restrictor 18 has aperture 20 which is of a smaller diameter than the inner diameter defined by area of device 12. Restrictor 18 is tack welded at only one point; i.e., is floating; to prevent any interference with the expansion of the vessel end wall.

Figure 3:
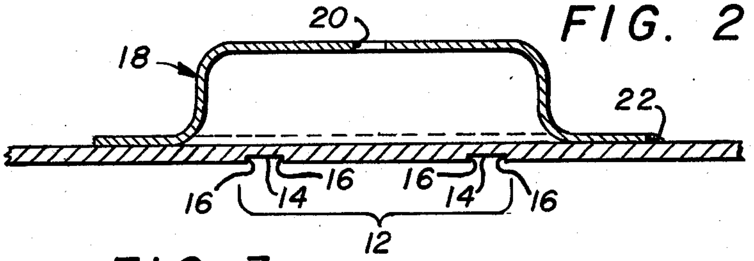
FIG. 3 is a cross-sectional view of the embodiment of FIG. 2 taken along line 2—2 of FIG. 2.

With reference now to FIG. 3, a cross-sectional view of FIG. 2 along lines 2—2 is seen. FIG. 3 further illustrates coined area 14. Also, the relative diameters of aperture 20 in restrictor 18 and region 14 in device 12 may be clearly seen from FIG. 3.

Figure 4:
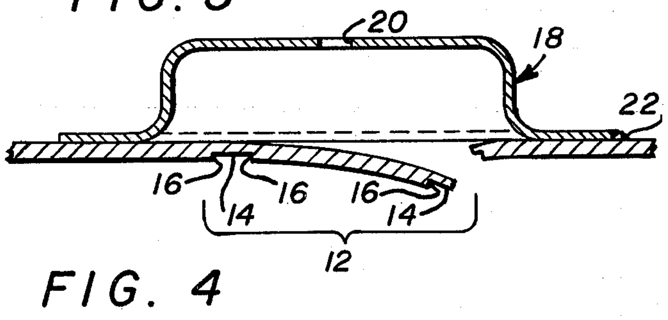
FIG. 4 is a cross-sectional view, taken along line 2—2 of FIG. 2, illustrating the venting of excess pressure due to the expansion of the vessel wall from over-pressurization.

Finally, referring to FIG. 4, device 12 is seen in its activated condition. The method of fabrication of vessel 10 results in the ends being softer than the side walls. Thus, the ends will expand outwardly as a result of overpressurization of vessel 10. This expansion of the end creates a stress in the metal. At a critical point the metal will separate thereby opening a flap and resulting in venting pressure from within vessel 10. By venting excess pressure from within vessel 10 the expansion rate of the end walls is reduced and fracture of the side of the vessel prevented. The restrictor 18 prevents too rapid a discharge of the contents of the vessel 10 and thus insures that the vessel will not be set into motion when the pressure relief device opens. It should be noted that the restrictor 18, will be held tightly against the inner wall of the vessel by the pressure differential when the device 12 opens.

The preferred structure of vessel 10 is to have the surfaces of the end walls be either flat or slightly convex and, upon overpressurization, the vessel will inherently attempt to assume a hemispherical shape. As the vessel end distorts outwardly pursuant to its tendency to assume the hemispherical shape, the metal will tear somewhere within area 14 where the metallurgical structure has been changed during the coining operation. That is, the material in area 14 does not, after coining, have the same ability to elongate as does the surrounding material.

As noted above, the activation point of the pressure relief device of the present invention floats with vessel wall thickness. This may be contrasted with the prior art wherein pressure relief devices are carefully and separately manufactured to have a fixed activation pressure. The pressure relief devices of the present invention are, with the exception of the restrictor, integral with the vessel and customarily formed simultaneously with the formation of the feet in the bottom of the vessel. Also by way of contrast with the prior art, the devices of the present invention are not directly responsive to vessel internal pressure.

While a preferred embodiment has been described and illustrated, various modifications and substitutions may be made thereto without departing from the spirit and scope of the invention. Accordingly, it must be understood that the present invention has been described by way of illustration and not limitation.

What is claimed is:

1. A pressure vessel with an integral pressure relief valve comprising:

a pair of cylindrical vessel halves, said vessel halves having been formed from low carbon steel by a deep drawing operation, said vessel halves being joined together by welding to define the vessel, at least one end of said vessel having an arcuate shape which is other than hemispherical when viewed in cross-section;

a coined pattern in said one end of said vessel, said pattern being in the form of an arcuate groove which defines a region which acts as a rupturable valve member, said groove extending inwardly from the vessel exterior to a depth which is in the range of 67% to 45% of the thickness of said one end, said groove having a bottom which is at least partly flat; and a generally cup-shaped restrictor means having an inner wall surface defining the interior of said restrictor means, said wall surface having a cross-sectional area that is greater than said coined pattern and is arranged to surround and enclose said coined pattern within the vessel, said restrictor means being secured at a location adjacent the perimeter of the restrictor means, said location being small with respect to said perimeter, a major portion of said perimeter along with the rest of said restrictor means except for at said location remaining unsecured to said vessel to allow for partial relative separate movement of said restrictor means during deformation of said one end due to internal pressure to prevent interference of said restrictor means with said deformation, said restrictor means having aperture venting means in registration with said region of said coined pattern for rupture of said valve member by an excessive internal pressure, said aperture venting means being of a size smaller than said region of said coined pattern to prevent too rapid a discharge from said vessel upon fracture of said valve member.

2. The vessel of claim 1 wherein said coined area is generally coaxial with the vessel.

3. The vessel of claim 1 wherein said coined pattern transcribes an arc of greater than 180 degrees.

4. The vessel of claim 3 wherein said coined area is generally coaxial with the vessel.

5. A method of fabricating a pressure vessel comprising:

forming a pair of vessel halves by deep drawing;

coining the end of a first of said halves to form a narrow arcuate groove having a bottom which is at least partly flat, said groove extending inwardly from the exterior of the vessel half, the depth of said groove being in the range of 45% to 67% of the vessel half wall thickness;

spot welding an apertured member to the interior of the said vessel first half, at a location adjacent the outer perimeter of said member spaced radially outwardly from said groove, said member being positioned with the aperture therein spaced from and in registration with the region disposed inwardly of the arcuate groove formed during the coining step; and welding the vessel halves together to define a pressure vessel.

* * * * *